(12) United States Patent
Tamukai

(10) Patent No.: US 6,751,991 B2
(45) Date of Patent: Jun. 22, 2004

(54) STEERING LOCK DEVICE

(75) Inventor: Tomonori Tamukai, Hiroshima (JP)

(73) Assignee: U-Shin, Ltd., Tokyo (JP)

(*) Notice: Subject to any disclaimer, the term of this patent is extended or adjusted under 35 U.S.C. 154(b) by 18 days.

(21) Appl. No.: 10/187,804

(22) Filed: Jul. 3, 2002

(65) Prior Publication Data
US 2003/0015006 A1 Jan. 23, 2003

(30) Foreign Application Priority Data
Jul. 19, 2001 (JP) ........................................ 2001-219602

(51) Int. Cl.[7] .............................................. B60R 25/02
(52) U.S. Cl. ........................................... 70/186; 70/252
(58) Field of Search ............................ 70/182–186, 252

(56) References Cited

U.S. PATENT DOCUMENTS

| | | | | |
|---|---|---|---|---|
| 3,600,915 A | * | 8/1971 | Corboud | 70/252 |
| 3,673,829 A | * | 7/1972 | Mizuno | 70/252 |
| 3,686,906 A | * | 8/1972 | Watkins et al. | 70/252 |
| 3,748,877 A | * | 7/1973 | Wolter | 70/186 |
| 4,031,728 A | * | 6/1977 | Eichenauer | 70/252 |
| 4,052,869 A | * | 10/1977 | Weber | 70/252 |
| 4,333,325 A | * | 6/1982 | Morikawa et al. | 70/186 |
| 4,400,954 A | * | 8/1983 | Nakamoto et al. | 70/186 |
| 4,426,864 A | * | 1/1984 | Morikawa | 70/431 |
| 4,466,262 A | * | 8/1984 | Maiocco et al. | 70/252 |
| 4,487,042 A | * | 12/1984 | Mochida et al. | 70/186 |
| 4,495,786 A | * | 1/1985 | Masaki et al. | 70/186 |
| 4,837,567 A | * | 6/1989 | Kleefeldt et al. | 70/252 X |
| 5,036,686 A | * | 8/1991 | Ichinose | 70/186 |
| 5,036,687 A | * | 8/1991 | Takeuchi et al. | 70/186 |
| 5,092,147 A | * | 3/1992 | Mochida et al. | 70/252 |
| 5,255,547 A | * | 10/1993 | Burr et al. | 70/252 |
| 5,289,707 A | * | 3/1994 | Suzuki | 70/252 |
| 5,632,167 A | * | 5/1997 | Kawachi et al. | 70/186 |
| 6,035,675 A | * | 3/2000 | Zimmer et al. | 70/186 |
| 6,354,120 B1 | * | 3/2002 | Tan et al. | 70/252 |
| 6,382,003 B1 | * | 5/2002 | Watanuki et al. | 70/252 |
| 6,539,756 B2 | * | 4/2003 | Bartels et al. | 70/186 |
| 2001/0029758 A1 | * | 10/2001 | Kehr | 70/252 |
| 2002/0178769 A1 | * | 12/2002 | Okuno | 70/186 |
| 2003/0079509 A1 | * | 5/2003 | Ochi | 70/186 |

FOREIGN PATENT DOCUMENTS

JP    3029059    2/2000

* cited by examiner

Primary Examiner—Suzanne Dino Barrett
(74) Attorney, Agent, or Firm—Wenderoth, Lind & Ponack, L.L.P.

(57) ABSTRACT

A steering lock device 10 includes a movable member 32 that blocks an engagement groove 30 on a rotor 18 to prevent a lock lever 28 from re-engaging with the engagement groove 30 once engagement of the lock lever 28 with the engagement groove 30 is released with activation of a solenoid 26 and that terminates the prevention of the re-engagement when the rotor 18 is pulled forward. In this device, the rotor 10 is prevented from being unnecessarily locked, without requiring long-term activation of the solenoid.

16 Claims, 6 Drawing Sheets

STEERING LOCK DEVICE

BACKGROUND OF THE INVENTION

The present invention relates to a steering lock device for use in a vehicle such as a motorcar.

It has been known that steering lock devices in which steering is unlocked and start of an engine is permitted on the basis of a judgment on normality of a user with an electronic authenticating function using an electronic key may have a knob for turning a cylinder lock without requiring a mechanical key. In some steering lock devices of this type, electronic authentication is executed with detection of a push on the knob by a detector, an actuator that has locked a turn of a cylinder lock is activated after the authentication is verified, and this activation permits the cylinder lock to be turned and permits the steering to be unlocked.

In the steering lock device of the above-mentioned type, however, the activation of the actuator is terminated with elapse of a predetermined period of time, and there is a possibility that the cylinder lock may be locked again if the cylinder lock is left for a moment without being turned after electronic authentication with a push on the knob. For prevention of this trouble, the actuator has to be kept activated for a long time, and a problem of an increase in electric power consumption is thereby caused.

Once the cylinder lock is turned with the knob from a lock position, through an ACC position and an ON position, to a start position and is thereafter returned to the lock position, the cylinder lock gets locked and cannot be turned immediately to the ACC position. In order to turn again the cylinder lock to the ACC position, therefore, the knob has to be pulled in the lock position and then has to be pushed again and the electronic authentication has to be executed afresh.

Moreover, there is a steering lock device in which an engine having been started once and then stalled cannot be restarted without return of the cylinder lock to the lock position in order to prevent a double starting by a starter. When the engine is stalled accidentally, therefore, a series of steps beginning with the electronic authentication have to be taken over again and restart of the engine is extremely troublesome.

SUMMARY OF THE INVENTION

In order to solve the above problems, the present invention provides a steering lock device comprising
a turning member having an engagement groove formed on an outer circumferential portion thereof,
a body for housing the turning member so that the turning member can be moved in backward and forward directions and can be turned,
a detecting section for detecting a backward push of the turning member,
a control section that executes electronic authentication in cooperation with portable equipment, upon receiving a detection signal from the detecting section, and that transmits an activation signal to an actuator after verification of the authentication, and
a lock member that is activated by the actuator and that engages with the engagement groove of the turning member so as to prevent the turning member from being turned;
wherein a movable member is provided that blocks the engagement groove to prevent the lock member from reengaging with the engagement groove once engagement of the lock member with the engagement groove of the turning member is released with activation of the actuator and that terminates the prevention of the re-engagement when the turning member is pulled forward.

In the steering lock device according to the present invention, the movable member may be movably provided in the engagement groove of the turning member and be connected to the turning member through a biasing member, so that a backward push of the turning member causes the movable member to be biased backward by the biasing member and to block the engagement groove after release of engagement of the lock member with the engagement groove and so that a forward pull of the turning member causes the movable member to be pulled and moved with the turning member and to open the engagement groove to allow engagement of the lock member with the engagement groove.

In accordance with the steering lock device of the present invention, the turning member is prevented from being locked again unless being pulled out once electronic authentication is executed with a push on the turning member and once the turning member is unlocked with the activation of the lock member by the actuator. Therefore, the actuator does not have to be activated for a long time and thus electric power consumption can be reduced.

With this steering lock device having a function of preventing double starting by a starter it is no longer necessary to perform the troublesome steps of re-starting the engine in case of an accidental engine stall or the like, that is, the necessity to repeat the steps beginning with the electronic authentication with a pull and a re-push of the turning member.

When the lock member moves out of the engagement groove of the turning member, the movable member biased by the biasing members slips under the lock member and thus prevents the lock member from reentering into the engagement groove of the turning member. In this manner, the turning member can be prevented from being unnecessarily locked, with a simple configuration.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
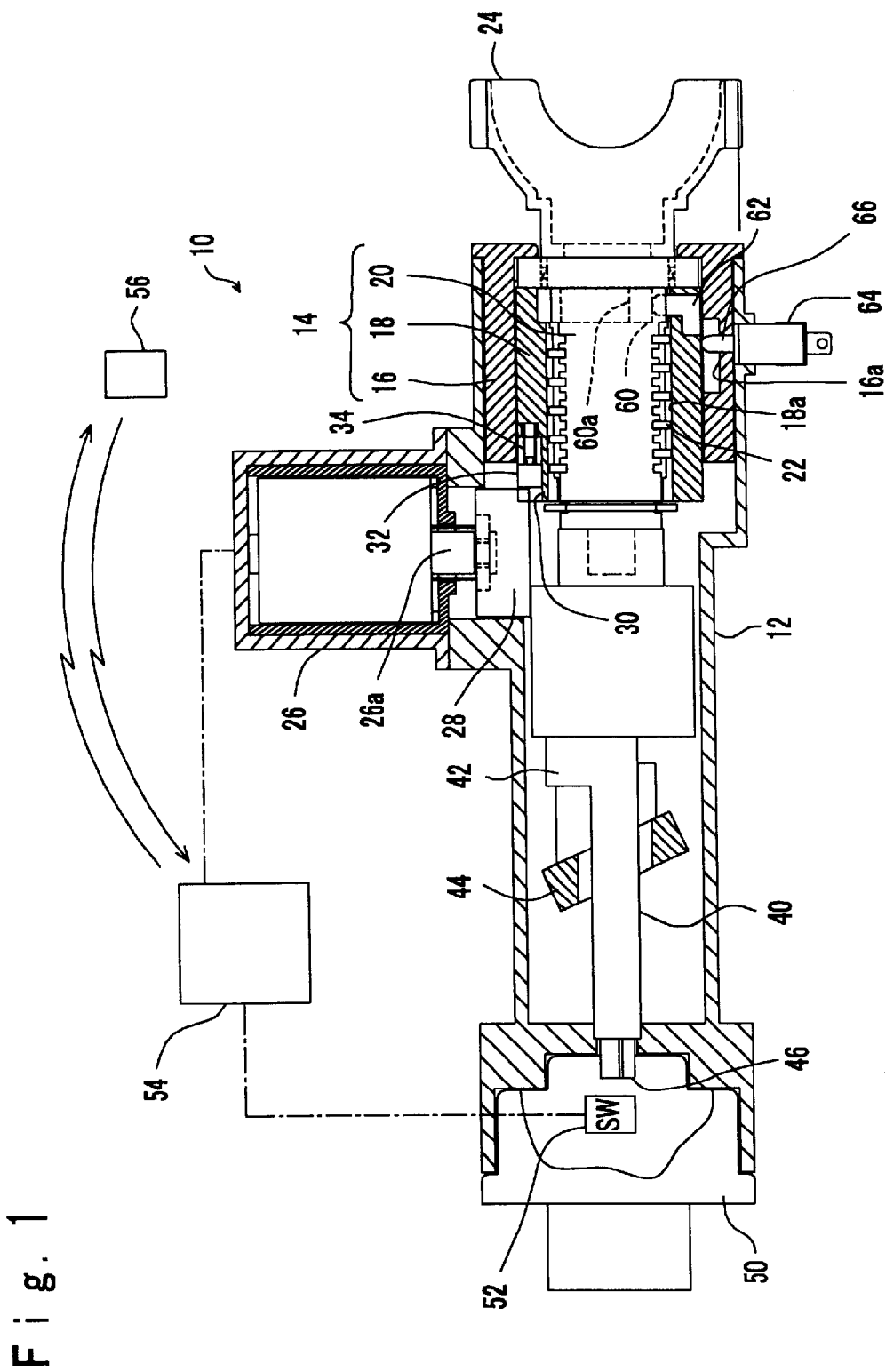
FIG. 1 is a longitudinal sectional view of a steering lock device according to the present invention.

FIG. 1 shows a longitudinal section of a steering lock device 10 as one embodiment of the present invention, taken along backward and forward directions. In FIG. 1 (ditto for FIGS. 5 and 8), for convenience the right side will be referred to as "fore" and the left side will be referred to as "back".

The steering lock device 10 has a generally cylindrical body 12 formed of metal such as aluminum in one piece. In a fore side of the body 12 is installed a cylinder lock 14. The cylinder lock 14 is composed of a cylindrical cylinder outer 16 that is fixed in the body 12, a cylindrical rotor (a turning member) 18 that is accommodated in the cylinder outer 16 so as to be capable of moving in the backward and forward directions and turning, and a columnar cylinder 20 that is accommodated in the rotor 18 so as to be capable of turning.

Figure 2:
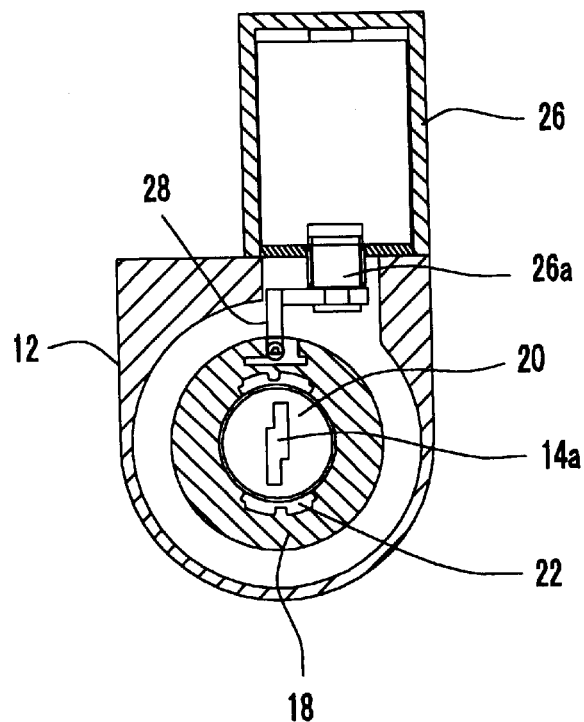
FIG. 2 is a cross-sectional view of the steering lock device of FIG. 1.

Inside the cylinder 20, a plurality of (ten in this embodiment) plate-like tumblers 22 are arranged at uniform intervals along a direction of an axis of the cylinder 20. The tumblers 22 are biased, by springs (not shown), in directions that are orthogonal to the direction of the axis of the cylinder 20 and that are different alternately. End portions of the tumblers 22 biased by the springs respectively protrude from both sides of an outer circumferential surface of the cylinder 20 when a mechanical key is not inserted in a keyhole 14a (see FIG. 2) of the cylinder lock 14. The protruded end portions of the tumblers 22 engage with lock grooves 18a formed on an inner circumferential surface of the rotor 18. This engagement prevents the cylinder 20 from turning in the rotor 18, and makes the cylinder 20 capable of turning integrally with the rotor 18 on condition that the rotor 18 is permitted to turn. When the mechanical key is inserted into the keyhole 14a of the cylinder lock 14, the tumblers 22 move toward the inside of the cylinder 20 and the protruded end portions of the tumblers 22 withdraw from the outer circumferential surface of the cylinder 20. The withdrawal of the tumblers 22 releases the engagement between the tumblers 22 and the lock grooves 18a of the rotor 18 and permits the cylinder 20 to be turned to a lock position, an ACC position, an ON position, and a start position in the rotor 18.

A knob 24 is attached to a fore end portion of the cylinder 20. The knob 24 has a slit-like inner space and the mechanical key can be inserted through the inner space into the keyhole 14a of the cylinder 20. On condition that the cylinder 20 can be turned in the rotor 18, the cylinder 20 can be turned to the lock position, the ACC position, the ON position, and the start position with a turn of the knob 24 by a user. On condition that the rotor 18 is permitted to be turned in the cylinder outer 16 as will be described later, the rotor 18 together with the cylinder 20 can be turned to the lock position, the ACC position, the ON position, and the start position with a turn of the knob 24 by a user.

To an upper portion of the body 12 is fixed a solenoid 26 as an actuator. On a plunger 26a of the solenoid 26 is installed a lock lever (a lock member) 28. When the solenoid 26 is not activated, the lock lever 28 is in a position shown in FIG. 1. When the solenoid 26 is activated, the lock lever 28 is lifted up by the plunger 26a of the solenoid 26.

Figure 3:
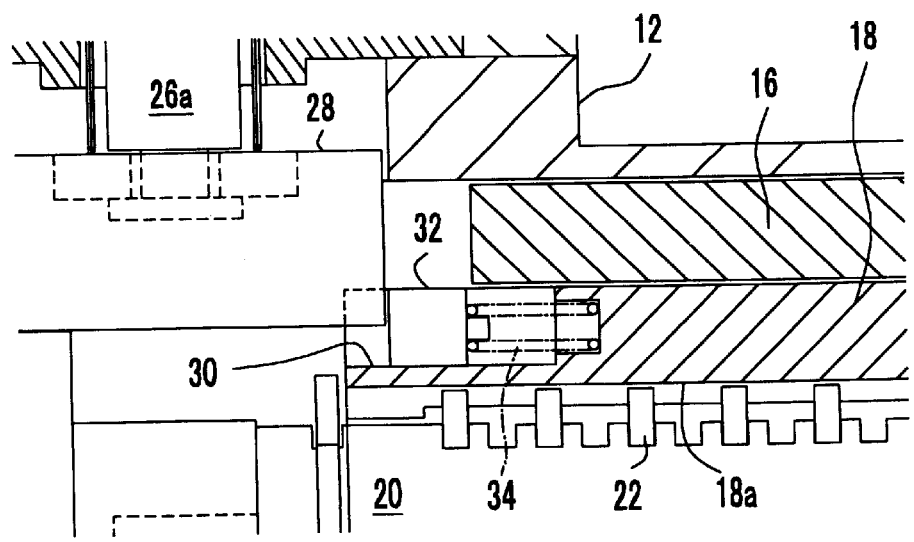
FIG. 3 is a partially enlarged view of FIG. 1.

As shown in FIGS. 1 and 3, an engagement groove 30 is formed on an outer circumferential portion on the backside of the rotor 18. When the solenoid 26 is not activated, an edge portion of the lock lever 28 is engaged with the engagement groove 30. The engagement prevents the rotor 18 from being turned.

Figure 4:
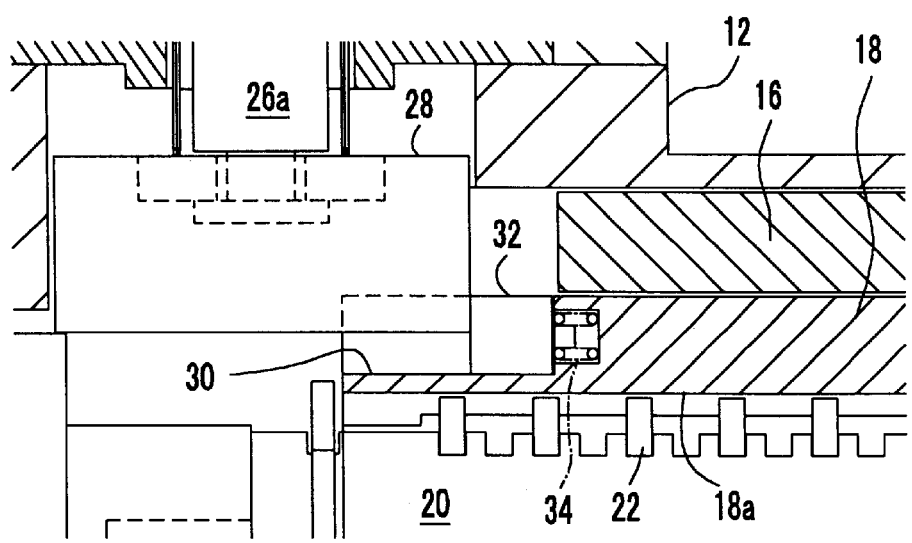
FIG. 4 is a partially enlarged view of FIG. 1.

In the engagement groove 30 of the rotor 18, a movable member 32 is slidably provided. The movable member 32 is connected to the rotor 18 through a spring (biasing member) 34. In a state shown in FIG. 1 (that is, a state in which the rotor 18 has not been pushed backward), the spring exerts neither biasing forces nor tractive forces on the movable member 32. When the rotor 18 is pushed and is moved backward as shown in FIG. 4, the spring 34 is compressed and the movable member 32 is thereby biased backward. It is noted that the biasing member connected to the movable member 32 is not limited to a spring but may be an elastic element of rubber or the like.

Again referring to FIG. 1, a shaft 40 formed integrally with a cam 42 is connected to a rear end portion of the cylinder 20. A lock shaft 44 that is generally shaped like a bracket and that is biased by a spring (not shown) is in contact with the cam 42. With this arrangement, a turn of the cylinder lock 14 from the lock position to the ACC position causes the shaft 40 and the cam 42 to turn together and causes the lock shaft 44 to move toward innermost in FIG. 1. As a result, a tip end portion of the lock shaft 44 comes off from a recess on a steering shaft (not shown) and steering lock is released.

On a rear end portion of the body 12, an ignition switch 50 is mounted. A conductive section 46 is provided on a rear end portion of the shaft 40 extending into the ignition switch 50. Inside the ignition switch 50, a switch (a detecting section) 52 is provided so as to face the conductive section 46. When the knob 24 is pushed backward, the conductive section 46 on the rear end portion of the shaft 40 comes into contact with the switch 52 and backward travel of the cylinder 20 and the rotor 18 is thereby detected with the switch 52.

The switch 52 is electrically connected to a controller (a control section) 54. The controller 54 is electrically connected to the solenoid 26. When receiving a detection signal from the switch 52, the controller 54 executes electronic authentication by exchanging signals by radio with an electronic key (portable equipment) 56 the user has. After the authentication is verified, the controller 54 transmits an activation signal to the solenoid 26.

Inside a fore side portion of the rotor 18, a slider 60 is provided so as to be capable of sliding in a direction orthogonal to the direction of the axis of the cylinder 20. The slider 60 has a key insertion hole 60a similar to the keyhole 14a of the cylinder 20, and the key insertion hole 60a and the keyhole 14a of the cylinder 20 have different positions when the mechanical key is not inserted.

A slide pin 62 that is generally shaped like a character "L" is provided so as to be in contact with a lower portion of the slider 60. The slide pin 62, together with the rotor 18, can be slid in the backward and forward directions. A recess 16a in which the slide pin 62 having slid backward is to fit is formed on an inner circumferential surface of the cylinder outer 16 and in the neighborhood of a position where the slide pin 62 is provided. Into the recess 16a protrudes a detection pin 66 of a key detection switch 64 installed in a lower portion of the body 12.

Hereinbelow, operations of the steering lock device 10 with the above configuration will be described.

Figure 5:
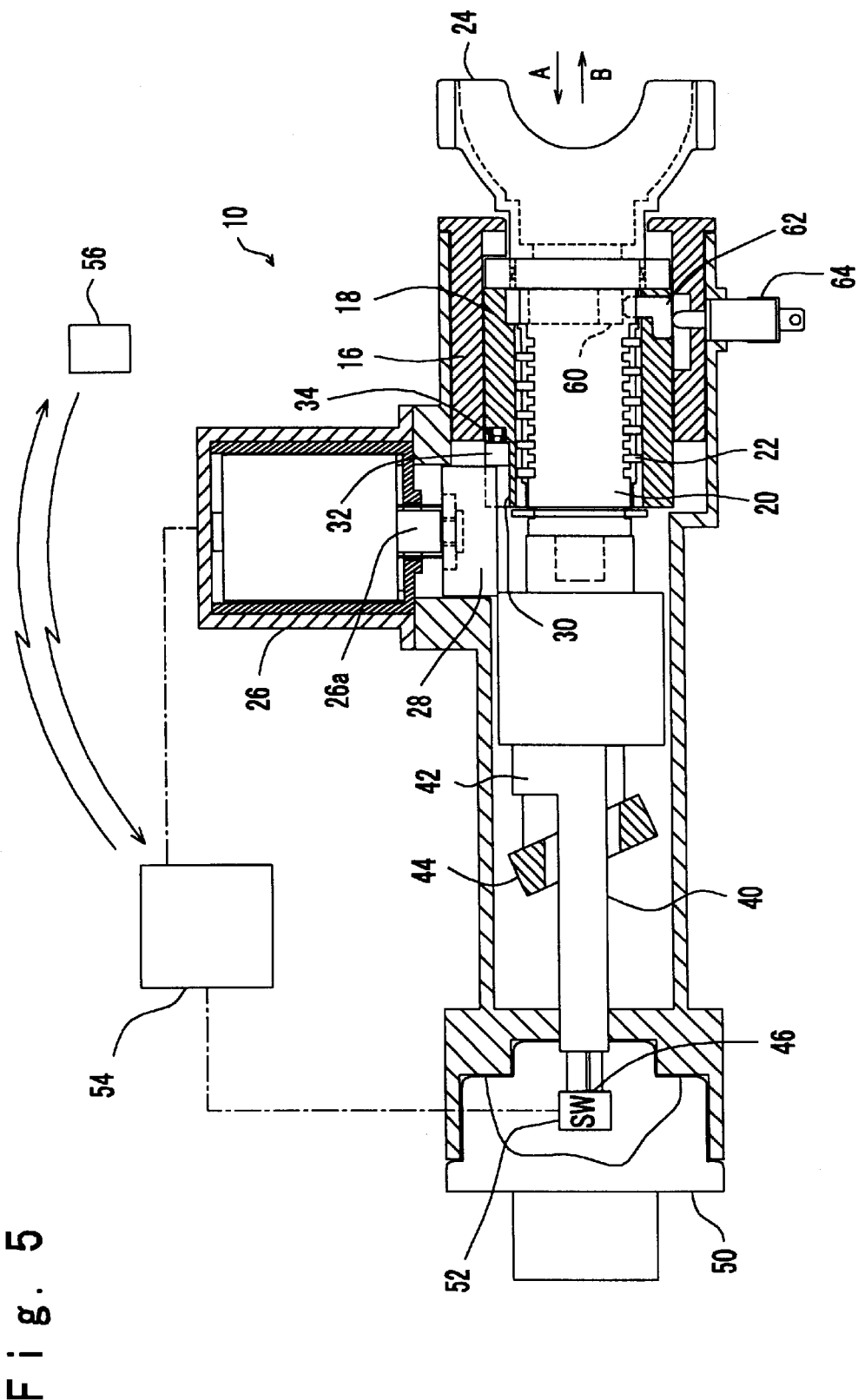
FIG. 5 is a longitudinal sectional view of the steering lock device in which a knob has been pushed.

In a procedure by which a user starts an engine, as shown in FIG. 5, the knob 24 is initially pushed in a direction of an arrow A (i.e., backward direction) in a state in which the rotor 18 and the cylinder 20 are in the lock position. With this operation, the rotor 18, the cylinder 20, the slider 60, the slide pin 62, and the shaft 40 move backward together. At this time, as shown in FIG. 4, the backward movement of the rotor 18 causes the spring 34 to be compressed and the movable member 32 is biased against the lock lever 28 by the compressed spring 34.

In addition, the push of the knob 24 causes the conductive section 46 on the rear end of the shaft 40 to come into contact with the switch 52. The switch 52 thus detects the backward push of the knob 24 and the rotor 18 and then transmits a detection signal to the controller 54. The controller 54 having received the detection signal transmits radio waves to the electronic key 56 the user has, receives a radio signal transmitted from the electronic key 56 in response to the radio waves, and thereby executes electronic authentication. After the authentication is verified, the controller 54 transmits an activation signal to the solenoid 26.

Figure 6:
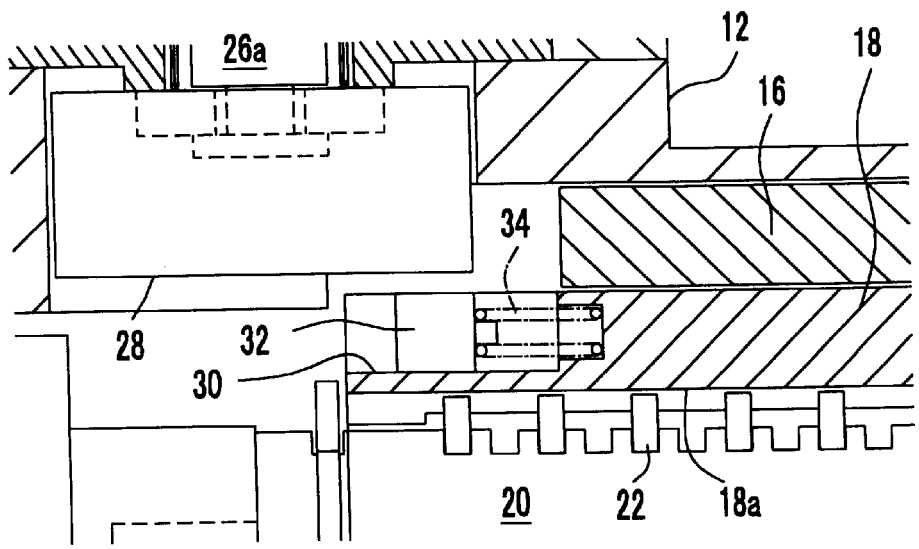
FIG. 6 is a partially enlarged view of FIG. 5.

The solenoid 26 is activated by the activation signal from the controller 54 so as to retract the plunger 26a. The lock lever 28 attached to the plunger 26a is thereby lifted up, the engagement of the lever 28 with the engagement groove 30 of the rotor 18 is released, and the rotor 18 is permitted to be turned. Simultaneously, as shown in FIG. 6, the movable member 32 biased by the spring 34 moves, slips under the lock lever 28 and thus blocks the engagement groove 30.

Figure 7:
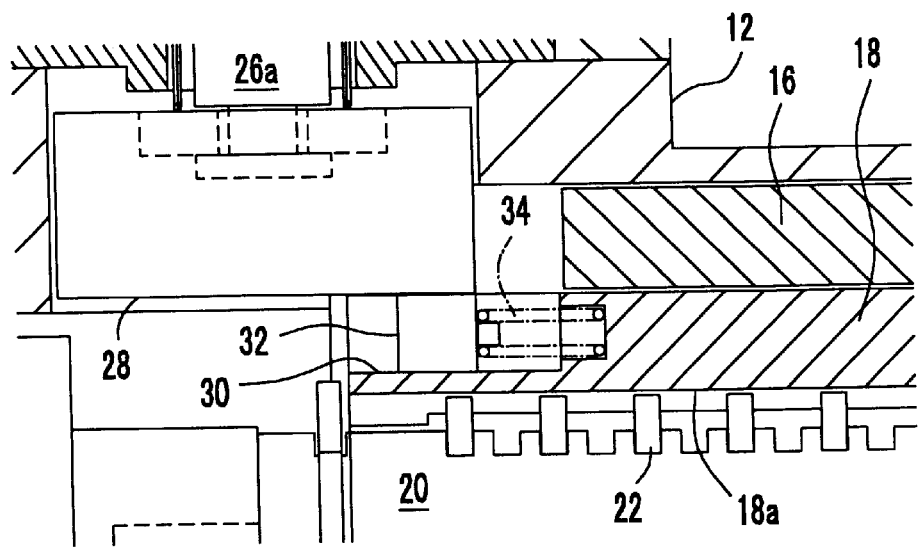
FIG. 7 is a partially enlarged view of FIG. 5.

The activation of the solenoid 26 is terminated with elapse of a predetermined period of time, and the plunger 26a then protrudes from the solenoid 26 to lower the lock lever 28. As shown in FIG. 7, however, the engagement groove 30 of the rotor 18 has been blocked by the movable member 32, and therefore the lock lever 28 comes into contact with a top of the movable member 32 and is prevented from re-engaging with the engagement groove 30.

It is noted that a top surface of the movable member 32 is configured so as to be flush with an outer circumferential surface of the rotor 18 where the engagement groove 30 is formed and therefore the lock lever 28 in contact with the top of the movable member 32 never hinders a turn of the rotor 18.

In this state, the user turns the knob 24 to turn the cylinder 20 and the rotor 18 from the lock position, through the ACC position and the ON position, to the start position, activates the ignition switch 50 by means of the shaft 40, and thereby starts the engine. When the cylinder 20 and the rotor 18 turn from the lock position to the ACC position, the shaft 40 and the cam 42 also turn with the cylinder 20 and the rotor 18, and the turn of the cam 42 causes the movement of the lock shaft 44, the tip end portion of the lock shaft 44 thereby comes off from the recess on the steering shaft, so that steering lock is released. When the user takes a hand of the user off the knob 24 after the start of the engine, the cylinder 20, the rotor 18, and the knob 24 automatically return to the ON position.

In operation for stopping the engine, the user turns the knob 24 opposite to the direction in the operation for starting the engine and thereby turns back the cylinder 20 and the rotor 18 from the ON position through the ACC position to the lock position. When the cylinder 20 and the rotor 18 return to the lock position, the lock shaft 44 moves with a turn of the cam 42 and engages with the recess on the steering shaft so that steering is locked. At this time, the engagement groove 30 of the rotor 18 remains blocked with the movable member 32, and therefore the lock lever 28 is prevented from engaging with the engagement groove 30 and the rotor 18 is not locked. For restarting the engine, accordingly, the knob 24 can be only turned instantly to turn the rotor 18 and the cylinder 20.

When the user pulls the knob 24 in a direction of an arrow B as shown in FIG. 5 in a state in which the cylinder 20 and the rotor 18 have been returned to the lock position with the knob 24, the cylinder 20, the rotor 18, and the shaft 40 move forward. At this time, the movable member 32 having been in the status shown in FIG. 7 is pulled forward through action of the spring 34 connected to the rotor 18 and shifts to an initial position (i.e., status shown in FIG. 3). The shift of the movable member 32 terminates the status in which re-engagement of the lock lever 28 with the engagement groove 30 is prevented. That is, as shown in FIG. 3, the shift of the movable member 32 makes the engagement groove 30 open, and the lock lever 28 having moved out of contact with the movable member 32 descends and re-engages with the engagement groove 30. The rotor 18 is locked in this manner.

On the other hand, the steering lock device 10 can be operated not only with the knob 24 but also with a mechanical key. When the mechanical key is attempted to be inserted into the keyhole 14a (see FIG. 2) of the cylinder 20 through the slit-like inner space in the knob 24, the mechanical key 2 can not be inserted fully into the cylinder 20, because the key insertion hole 60a of the slider 60 and the keyhole 14a of the cylinder 20 are in different positions and the slider 60 is prevented from being slid downward due to a presence of the slide pin 62 between the slider 60 and the cylinder outer 16, as shown in FIG. 1.

Figure 8:
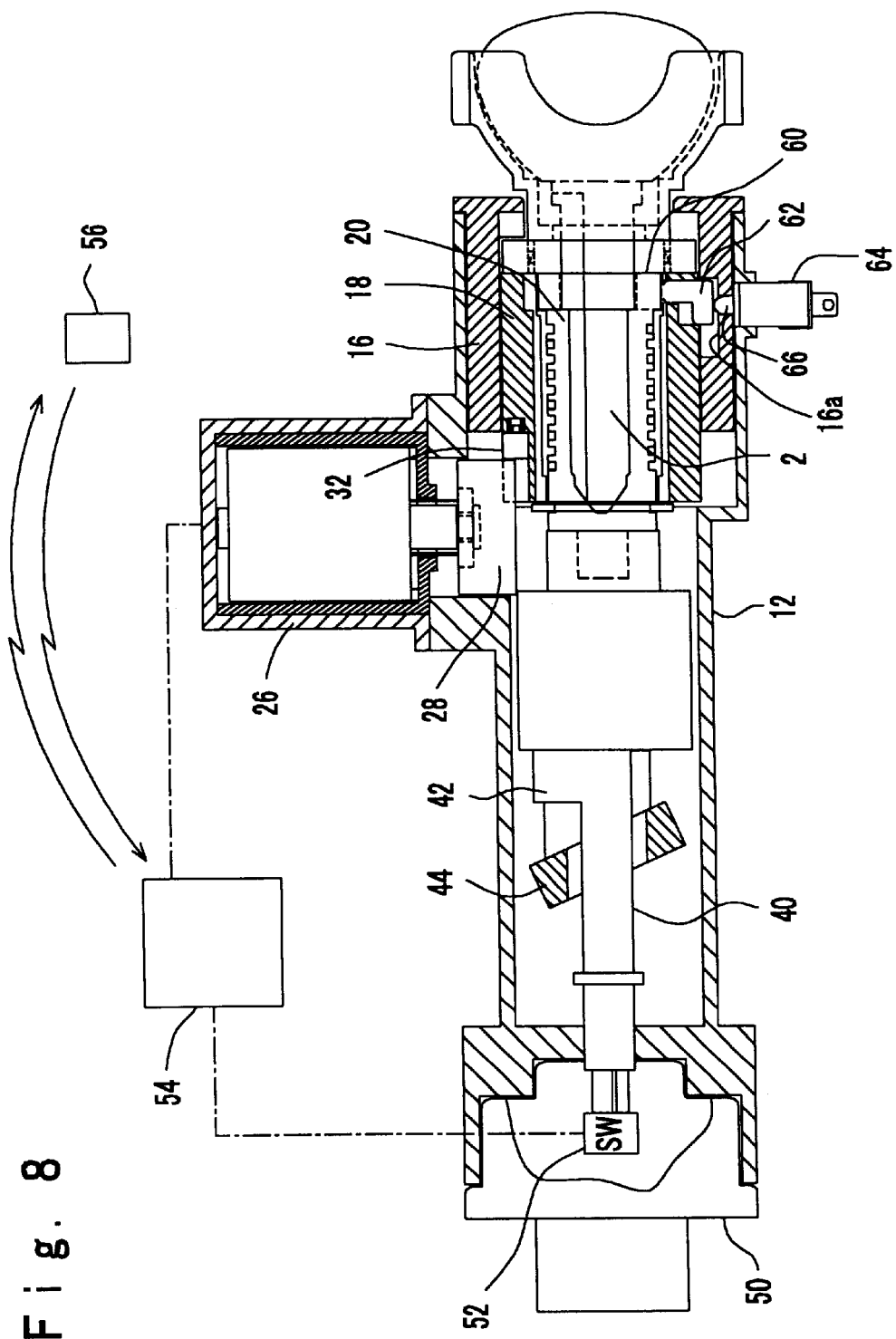
FIG. 8 is a longitudinal sectional view of the steering lock device in which a mechanical key has been inserted.

When the mechanical key 2 is pushed on condition that a tip end portion of the mechanical key 2 has been inserted to a shallow depth in the keyhole 14a of the cylinder 20, the slider 60, the slide pin 62, the cylinder 20, and the rotor 18 move backward together as shown in FIG. 8. With this movement, the slide pin 62 comes into the recess 16a of the inner circumferential surface of the cylinder outer 16 and thereby allows the slider 60 to slide in the downward direction (the direction orthogonal to the axis of the cylinder 20). As a result, the key insertion hole 60a of the slider 60 coincides with the keyhole 14a of the cylinder 20 and the mechanical key 2 can fully be inserted into the cylinder 20.

The slide pin 62 comes into the recess 16a of the inner circumferential surface of the cylinder outer 16 and thereby pushes the detection pin 66 of the key detection switch 64, so that the insertion of the mechanical key 2 is detected by the key detection switch 64. Use of the detection of the insertion of the key is made for a warning for preventing the key from being left behind or the like.

Release of steering lock, release of the rotor 16 by electronic authentication, functions of the movable member 32, and the like in operations with use of the mechanical key 2 are the same as those in the operations with use of the knob 24 that have been described above, and duplicative description on those is therefore omitted. On condition that the rotor 18 has been unlocked with the activation of the solenoid 26, however, a turn of the mechanical key 2 does not cause a turn of the rotor 18 but only causes a turn of the cylinder 20 because the slide pin 62 is in engagement with both the rotor 18 and the cylinder outer 16.

At this time, control with the controller 54 may be performed so that the electronic authentication described above is not executed and so that the solenoid 26 is not activated on condition that the insertion of the key has been detected by the key detection switch 64. With this arrangement, the lock lever 28 that remains in engagement with the engagement groove 30 keeps the rotor 18 locked and a turn of the mechanical key 2 causes only the cylinder 20 to turn.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A steering lock device comprising:

a turning member having an engagement groove formed on an outer circumferential portion thereof, a body for housing the turning member so that the turning member can be moved in backward and forward directions and can be turned, a detecting section for detecting a backward push of the turning member, a control section that executes electronic authentication in cooperation with portable equipment, upon receiving a detection signal from the detecting section, and that transmits an activation signal to an actuator after verification of the authentication, and a lock member that is activated by the actuator and that engages with the engagement groove of the turning member so as to prevent the turning member from being turned;

wherein a movable member is provided that blocks the engagement groove to prevent the lock member from re-engaging with the engagement groove once engagement of the lock member with the engagement groove of the turning member is released with activation of the actuator and that terminates the prevention of the re-engagement when the turning member is pulled forward.

2. A steering lock device as claimed in claim 1, wherein the movable member is movably provided in the engagement groove of the turning member and is connected to the turning member through a biasing member so that a backward push of the turning member causes the movable member to be biased backward by the biasing member and to block the engagement groove after release of engagement of the lock member with the engagement groove and so that a forward pull of the turning member causes the movable member to be pulled and moved with the turning member and to open the engagement groove to allow engagement of the lock member with the engagement groove.

3. A steering lock device as claimed in claim 1, wherein said engagement groove extends in an axial direction of said turning member.

4. A steering lock device as claimed in claim 3, wherein said movable member is slidably mounted in said engagement groove for movement in said axial direction of said turning member.

5. A steering lock device as claimed in claim 4, wherein said lock member is movable in a radial direction of said turning member.

6. A steering lock device as claimed in claim 5, wherein said actuator, upon activation, is operable to move said lock member in a radially outward direction.

7. A steering lock device comprising:

a housing body;

a turning member mounted in said housing body so as to be rotatable and axially movable in forward and backward directions, said turning member having an engagement groove formed therein;

a lock member supported by said housing body so as to be movable between an extended position, in which said lock member engages in said engagement groove of said turning member so as to prevent rotation of said turning member, and a retracted position in which said lock member is retracted out of said engagement groove of said turning member;

an actuator coupled to said lock member to move said lock member between said extended and retracted positions;

a movable member movably mounted for movement relative to said turning member between a rest position and a lock member-blocking position in which said movable member prevents said lock member from being moved from said retracted position to said extended position thereof;

a detecting section for issuing a detection signal upon detecting a backward push of said turning member; and a control section for, upon receiving a detection signal from said detection section, executing electronic authentication and transmitting an activation signal to said actuator upon verification of the authentication.

8. A steering lock device as claimed in claim 7, further comprising a biasing member biasing said movable member toward said lock member-blocking position.

9. A steering lock device as claimed in claim 8, wherein said engagement groove extends in an axial direction of said turning member.

10. A steering lock device as claimed in claim 9, wherein said movable member is slidably mounted in said engagement groove for movement in said axial direction of said turning member.

11. A steering lock device as claimed in claim 10, wherein said lock member is movable in a radial direction of said turning member.

12. A steering lock device as claimed in claim 11, wherein said actuator, upon activation, is operable to move said lock member in a radially outward direction.

13. A steering lock device as claimed in claim 7, wherein said engagement groove extends in an axial direction of said turning member.

14. A steering lock device as claimed in claim 13, wherein said movable member is slidably mounted in said engagement groove for movement in said axial direction of said turning member.

15. A steering lock device as claimed in claim 14, wherein said lock member is movable in a radial direction of said turning member.

16. A steering lock device as claimed in claim 15, wherein said actuator, upon activation, is operable to move said lock member in a radially outward direction.

* * * * *